United States Patent
Langdon (10) Patent No.: US 11,520,565 B2
(45) Date of Patent: *Dec. 6, 2022

(54) INTERPRETER FOR INTERPRETING A DATA MODEL ALGORITHM AND CREATING A DATA SCHEMA

(71) Applicant: TIBCO Software Inc., Palo Alto, CA (US)

(72) Inventor: Andrew Langdon, San Francisco, CA (US)

(73) Assignee: TIBCO Software Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/129,549

(22) Filed: Dec. 21, 2020

(65) Prior Publication Data

US 2021/0109720 A1 Apr. 15, 2021

Related U.S. Application Data

(63) Continuation of application No. 16/104,050, filed on Aug. 16, 2018, now Pat. No. 10,891,114.

(Continued)

(51) Int. Cl.
*G06F 9/44* (2018.01)
*G06F 8/35* (2018.01)
(Continued)

(52) U.S. Cl.
CPC .................. *G06F 8/35* (2013.01); *G06F 8/44* (2013.01); *G06F 16/212* (2019.01); *G06F 16/2365* (2019.01)

(58) Field of Classification Search
CPC . G06F 8/35; G06F 8/44; G06F 16/212; G06F 16/2365

(Continued)

(56) References Cited

U.S. PATENT DOCUMENTS 5,970,490 A 10/1999 Morgenstern
7,289,997 B1* 10/2007 Kita ...................... G06F 16/289

(Continued)

OTHER PUBLICATIONS

Title: Generic schema matching with cupid; author: J Madhavan, published on 2001.*

(Continued)

*Primary Examiner* — Chameli Das
(74) *Attorney, Agent, or Firm* — McGuireWoods LLP (57) ABSTRACT

A computing device for interpreting a data model algorithm includes an object searcher, an interpreter, and a translator. The object searcher is configured to search for attributes within datasets generated from at least one method of an instantiation of the data model algorithm in a development mode workflow. The interpreter is configured to evaluate the attributes, identify attributes having a use type, identify the type information of the identified attribute, and create data schema using the identified attributes and type information. The use type can be determined based on attribute values or an interface type associated with an identified attribute. The translator is configured to compare the data schema with another data schema in response to selecting the data model algorithm for inclusion in a production mode workflow.

20 Claims, 2 Drawing Sheets

Related U.S. Application Data (60) Provisional application No. 62/546,674, filed on Aug. 17, 2017.

(51) Int. Cl.
*G06F 8/41* (2018.01)
*G06F 16/21* (2019.01)
*G06F 16/23* (2019.01)

(58) Field of Classification Search
USPC .......................................................... 717/104
See application file for complete search history.

(56) References Cited

U.S. PATENT DOCUMENTS

| | | | | |
|---|---|---|---|---|
| 11,323,489 | B1* | 5/2022 | Panwar | H04L 51/10 |
| 2002/0077790 | A1* | 6/2002 | Bisgaard-Bohr | G06Q 30/02 |
| | | | | 703/2 |
| 2003/0135840 | A1* | 7/2003 | Szabo | G06F 9/541 |
| | | | | 717/102 |
| 2008/0082959 | A1* | 4/2008 | Fowler | G06F 9/44505 |
| | | | | 717/104 |
| 2008/0120129 | A1 | 5/2008 | Seubert et al. | |
| 2008/0189679 | A1* | 8/2008 | Rodriguez | G06F 8/34 |
| | | | | 717/105 |
| 2012/0116743 | A1* | 5/2012 | Ayala | G06F 16/25 |
| | | | | 703/13 |
| 2012/0290940 | A1* | 11/2012 | Quine | G06F 16/212 |
| | | | | 715/744 |
| 2013/0054627 | A1* | 2/2013 | Rausch | G06Q 40/04 |
| | | | | 707/758 |
| 2014/0365533 | A1 | 12/2014 | Debray et al. | |
| 2015/0095923 | A1 | 4/2015 | Sarid | |
| 2017/0139983 | A1 | 5/2017 | Neels et al. | |
| 2017/0262769 | A1* | 9/2017 | McShane | G06F 9/54 |
| 2017/0316114 | A1* | 11/2017 | Bourhani | G06F 8/34 |
| 2017/0351511 | A1 | 12/2017 | Bar-Or et al. | |
| 2018/0067732 | A1 | 3/2018 | Seetharaman et al. | |
| 2019/0042290 | A1* | 2/2019 | Bailey | G06F 8/51 |
| 2020/0151202 | A1 | 5/2020 | Bolcer et al. | |
| 2020/0311566 | A1* | 10/2020 | Ackerman | G06Q 10/00 |

OTHER PUBLICATIONS

Title: Comparison of schema matching evaluations author: HH Do, published on 2002.*
Title: Trajectory clustering with mixtures of regression models, author: S Gaffney; published on 1999.*
Title:Tailoring an analysis approach for developing evolvable software systems: experiences from three case studies, author: P De Bruyn. Published on 2016.*
Title: Tool for translating simulink models into input language of a model checker, author: B Meenakshi, published on 2006.*
S. Meinik et al, "Similarity Flooding: A Versatile Graph Matching Algorithm and its Application to Schema Matching" Published on 2000, source: IEEE.

* cited by examiner

INTERPRETER FOR INTERPRETING A DATA MODEL ALGORITHM AND CREATING A DATA SCHEMA

CROSS REFERENCE TO RELATED APPLICATION

This application is a Continuation Application of pending U.S. patent application Ser. No. 16/104,050, filed Aug. 16, 2018 entitled "AN INTERPRETER FOR INTERPRETING A DATA MODEL ALGORITHM AND CREATING A DATA SCHEMA" which claims priority to U.S. Provisional Patent Application No. 62/546,674, filed Aug. 17, 2017, entitled "EFFICIENT, CODE-FREE OPERATIONALIZATION OF PYTHON NOTEBOOKS" the entire contents of which are hereby fully incorporated herein by reference for all purposes.

TECHNICAL FIELD OF THE DISCLOSURE

The present disclosure relates, in general, to the development of data models for use with development and production mode computing systems and, in particular, to the interpretation of a development mode data model and creation of a data schema for use in a production level computing system, e.g. a production level clustered computing system.

BACKGROUND

Data analysis and model development usually start with an exploratory phase. A data scientist can examine project data using statistical analysis tools as well as the goals for a particular project. Often, this exploratory phase and development mode is used to refine an existing data model algorithm which then must be translated to a useful production environment. Data scientists often work in a programming language called Python$^{TM}$, Python$^{TM}$ can be an attractive development mode tool because it allows for easy, rapid development and, therefore, tight production cycles. However, Python$^{TM}$ may not be considered the best production level software development tool. This can be especially true where dataset sizes can span multiple cluster nodes in cluster computing environments. Model algorithms written in Python$^{TM}$ are often recreated for production mode using other programming languages better suited for processing larger workloads. The recreated model algorithm can ultimately result in significantly different behaviors than the Python$^{TM}$ algorithm created in development and can result in significantly different data analytics production flow. For example, actions taken when in production mode may be different than when the initial algorithm was developed. As a result, production model algorithm may be programmed to produce a data flow different that the data flow produced by the development model algorithm. The production level transformations can impact analytic results of datasets and, therefore, impact further data model development. Although there are tools such as Microsoft Azure that can provide some assistance for managing model algorithms between development and production mode for cluster computing environments, these tools do not completely bridge the gap and require additional programming steps. These additional programming steps can significantly increase costs and complexity, affect the quality and accuracy of data analytics, and cause inefficiencies in production schedules.

SUMMARY

The present disclosure disclosed herein comprises a computing device having a mechanism configured to search, interpret and translate data attributes and associated type information of an instantiated object space into a data schema used for comparison with a production level data schema used within a clustered computing environment.

In one aspect, the present disclosure is directed to a computing device for interpreting a data model algorithm that includes an object searcher, an interpreter, and a translator. The object searcher is configured to search for attributes within datasets generated from at least one method of an instantiation of the data model algorithm in a development mode workflow. The interpreter is configured to evaluate the attributes, identify attributes having a use type, identify the type information of the identified attribute, and create data schema using the identified attributes and type information. The translator is configured to compare the data schema with production level data schema.

In some embodiments, the interpreter can be configured to determine the use type by evaluating attribute values associated with an identified attribute. In some embodiments, the interpreter can be configured to determine the use type by evaluating an interface type associated with an identified attribute. In these embodiments, each attribute and type define a column name and type in the data schema. In certain embodiments, the translator can be configured to compare column heading types of the data schema and the production level data schema to determine validity of the data schema. In one embodiment, the translator can be configured to automatically retrieve the production level data schema from a clustered computing environment in response to selecting the data model algorithm for inclusion in a production mode workflow. In certain embodiments, the data model algorithm can be a Python Notebook.

In another aspect, the present disclosure is directed to a method for interpreting a data model algorithm. The method includes searching for attributes within datasets generated from at least one method of an instantiation of the data model algorithm in a development mode workflow; evaluating the attributes, identifying attributes having a use type, identifying the type information of the identified attribute, and creating data schema using the identified attributes and type information; and comparing the data schema with production level data schema.

The method can also include determining the use type by evaluating attribute values associated with an identified attribute; and/or determining the use type by evaluating an interface type associated with an identified attribute; and/or comparing column heading types of the data schema and the production level data schema to determine validity of the data schema; and/or automatically retrieving the production level data schema from a clustered computing environment in response to selecting the data model algorithm for inclusion in a production mode workflow.

In a further aspect, the present disclosure is directed to non-transitory computer readable storage medium comprising a set of computer instructions executable by a processor for interpreting a data model algorithm. The computer instructions are configured to search for attributes within datasets generated from at least one method of an instantiation of the data model algorithm in a development mode workflow; evaluate the attributes, identify attributes having a use type, identify the type information of the identified attribute, and create data schema using the identified attributes and type information; and compare the data schema with production level data schema.

Additional computer instructions can be configured to determine the use type by evaluating attribute values associated with an identified attribute; and/or to determine the use type by evaluating an interface type associated with an identified attribute; and/or compare column heading types of the data schema and the production level data schema to determine validity of the data schema; and/or automatically retrieve the production level data schema from a clustered computing environment in response to selecting the data model algorithm for inclusion in a production mode workflow.

Additional embodiments, advantages, and novel features are set forth in the detailed description.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Figure 1:
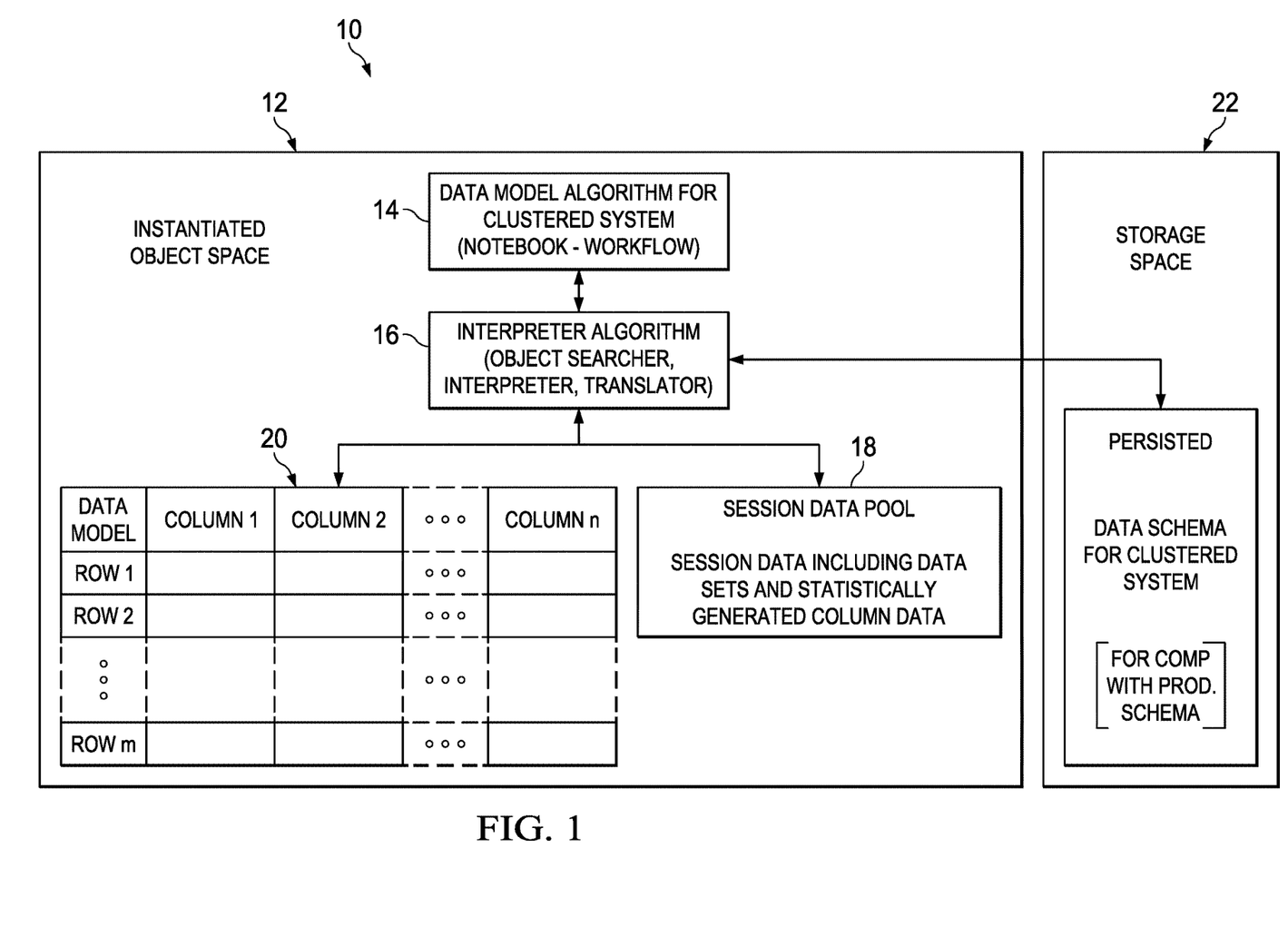
FIG. 1 is a block diagram illustration of a system of a computing device for managing datasets of a data model, in accordance with certain example embodiments.

Referring now to FIG. 1, illustrated is a diagram of a system of a computing device for managing datasets of a data model, in accordance with certain example embodiments, denoted generally as 10. The system diagram 10 includes an instantiated object space 12 and a storage space 22. The instantiated object space 12 includes instantiated software code and data from a data model algorithm 14 and an interpreter algorithm 16 instantiated within a development mode programming environment. The data model algorithm 14 can be a Python Notebook used to develop data models for clustered computing environments in a development mode setting. The data model algorithm 14 can be executed within a Notebook workspace. Another data model algorithm that is developed in another software language and based on the data model algorithm 14 can be executed in a clustered computing environment in a production mode setting. Ideally, metadata associated with datasets relevant to the clustered computing environments should be consistent whether executing in development or production mode, except where an environment includes software and datasets that are only specific to a particular mode. The storage space 22 can include persisted versions of the production mode and development mode datasets.

The data model algorithm 14 can process data and generate datasets based on target data, e.g. marketing data, algorithmic method or methods, statistical information, historical information, and other information used in data visualization techniques. During execution, the data model algorithm 14 can generate session data that includes the generated datasets and other data associated with instantiation and execution of the algorithm. The generated datasets can have an associated data type or stated differently type information. An example of a dataset in a schema format can include column names, which is the metadata, such as city, state, zip code, telephone number, and email address. The column names have a data type or type information which can be string value, integer value, long, double, etc. The interpreter algorithm 16 can include an object searcher function, an interpreter function, and a translator function. The interpreter algorithm 16 can monitor execution of the data model algorithm 14 and a session data pool 18 generated in response to execution. In an embodiment, the interpreter algorithm 16 can be a parent of the data model algorithm 14 and access the pool of session data to monitor, filter, and evaluate session pool data in order to determine relevant datasets, determine associated data types, and create a data schema.

The interpreter algorithm 16 can evaluate the session pool data to determine the datasets associated with an algorithmic method or methods of the data model algorithm 14. The interpreter algorithm 16 can determine the datasets by evaluating attributes and, optionally, values to determine if the attribute has an interface type, e.g. associated with a database or datasets used in data visualization with clustered computing environments. In addition, the interpreter algorithm 16 can evaluate the values associated with the attributes and determine its use type based on statistical or historical data. The interpreter algorithm 16 can determine the data type or type information of attributes identified as having a certain use type by inspecting attribute values or through declared statements with the data model algorithm 14. The interpreter algorithm 16 can generate a data schema 20 with associated data types based on the discovered attributes, i.e. metadata, of the datasets. The interpreter algorithm 16 can persist the generated data schema 20 to storage space 22. The interpreter algorithm 16 can translate the data model algorithm 14 from a development state to a production ready state by accessing and importing a data schema from a production level clustered computing environment and comparing and validating the persisted data schema 20 with the imported data schema. The interpreter algorithm 16 can compare metadata of the persisted data schema 20 with the metadata of the imported data schema. For example, if the column data of the two schemas match, the data model algorithm 14 can be translated into it production ready state. The translated version can include a value or identifier that indicates the data model algorithm 14 as being production ready.

Additional functionality of the interpreter algorithm 16 can include monitoring the session data pool 18 and identifying an execution state variable and value associated with a method function or functions of the data model algorithm 14. In other words, the execution state variable can be used by the interpreter algorithm 16 to identify software code specified within the data model algorithm 14 that is for only development mode use or production mode use. Some software code may only be relevant for a development mode setting and others may only be relevant for a production mode setting. The interpreter algorithm 16 can then translate the data model algorithm 14 from the development mode state to the production ready state with the appropriate execution state variable and value or variables and values. The solution provided allows users to develop models in Python™ while also allowing for differing behaviors based on the script execution context. With this variable, the user can perform rapid iterations in Python™ as well as have complex production behaviors without duplication of work, and without leaving the familiar development environment.

Further functionality of the interpreter algorithm 16 can include allowing for the execution of the data model algorithm 14 on different clusters, e.g. different Hadoop clusters, without manually switching the cluster location configurations. The can be useful because the developer or data scientist can work on a development cluster, which manages resources separately that the cluster that is using production models. The separation allows for faster refinement of data processes or statistical algorithms without interrupting important data analysts workflows. When the data model algorithm 14 is refined or the generated schema 20 is validated, the interpreter algorithm 16 can point the data model algorithm 14 to the production cluster to process real-world data associated with the production schema.

Configuring and managing connections to Hadoop data sources can be a difficult process that requires expert knowledge of complex datasets and structures. The interpreter algorithm 16 allows the data model algorithm 14 to run against multiple clusters without the need for a user to maintain copies of the cluster configuration files. The interpreter algorithm 16 automatically searches for production level configuration files and builds out the development level configuration files. The interpreter algorithm 16 can link select development level configurations files against nodes within a cluster to the data model algorithm 14 so that a user can easily execute the data model algorithm 14 within the production level clustered computing environment using a production level data schema.

The interpreter algorithm 16 can also maintain connection configuration parameters to Kerberos enabled clustered computing environments. That is to say the interpreter algorithm 16 maintains the configuration setting to authenticate with a Kerberos server for container access and gain authorization to a container service through authorization services of the Kerberos server. The interpreter algorithm 16 automatically authenticates and authorizes access to a container service when a containerized instance of the data model algorithm 14 is created. The interpreter algorithm 16 can also maintain Kerberos session tickets to the containerized service and re-authorize upon expiration of the tickets. The access to container services can be strictly controlled to users who should have access.

Figure 2:
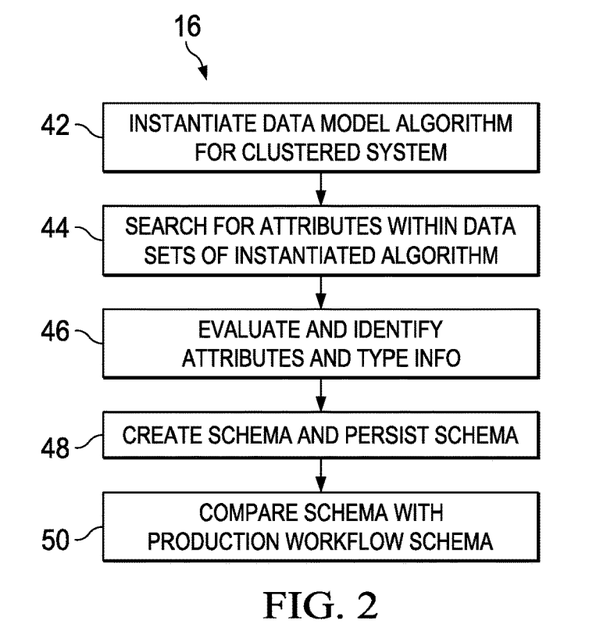
FIG. 2 is an flow diagram illustration of an interpreter algorithm of a computing device, in accordance with certain example embodiments.

Referring now to FIG. 2, illustrated is a flow diagram of interpreter algorithm 16, in accordance with certain example embodiments. The interpreter algorithm 16 begins when a data model algorithm 14 for clustered systems is instantiated, block 42. The interpreter algorithm 16 includes an object searcher functionality that searches through session data associated with the data model algorithm 14 to identify attributes, i.e. metadata, of datasets within the session data, block 44. The interpreter algorithm 16 includes an interpreter function that evaluates the attributes, identifies attributes having a use type and identifies the type information of the identified attribute, block 46. The use type can be determined by the interpreter functionality by evaluating attribute values associated with an identified attribute. The use type can also be determined by evaluating an interface type associated with an identified attribute. The interpreter functionality then creates a data schema 20 using the identified attributes and associated type information and persists the schema to storage, block 48. The interpreter algorithm 16 then compares the created schema with a production workflow schema, block 50. In this particular step, the interpreter algorithm 16 can automatically retrieve the production level data schema from a clustered computing environment in response to selecting the data model algorithm for inclusion in a production mode workflow.

The translation step allows the Notebook to programmatically adapt to the target cluster in order to use the available resources most effectively. When using PySpark of Apache Spark™ it can be important to set the number of computational units and their resources to the level that provides the maximum benefit while minimizing the costs to the overall duster. These values can be chosen by an engineer, or determined programmatically using an auto-tuning algorithm.

Data scientists frequently develop algorithms on development clusters with minimal resources and often leverage only sub samples of larger data sets. Accordingly, the Apache Spark™ setting that are appropriate for running the development environment can differ significantly from those required in the production setting. Failure to update these settings can lead to suboptimal performance, and even job failure due to OOM errors. Different duster structures and different utilization levels of a cluster may lead to distinct sets of optimal values that change frequently. Updating these values at each execution increases the overhead of executing the Notebook script, and requires operations engineers to manually update the Python Notebook, The translation step provides a mechanism to override Apache Spark™ tuning settings based on external factors. The external workflow or user can determine the optimal parameters, and just before the Notebook is executed, the translator retrieves this information, injects these settings into the script, and creates an Apache Spark™ context based on this real-time information. If these settings are determined programmatically, then each time the Notebook executes as part of an analytics workflow, its Apache Spark™ parameters will update, adapting for optimal execution on the cluster.

This environmental adjustment of Apache Spark™ parameters allows the Notebook to execute more efficiently, without the need to open the script in an editor and adjust the values manually. It allows the data scientist to concentrate on the contents of the script without worrying about execution details, while allowing the production execution context to tune the performance of the script without knowledge of the contents.

Operations engineers have the ability to set the production Apache Spark™ settings via a dropdown in the Python™ execute operator. Additionally, production Apache Spark™ configuration can be automatically determined by Alpine Data's Spark Auto-tuning technology. This technology analyses the size of the input datasets and, at runtime, determines the size and utilization of the target Hadoop cluster to compute an estimate for the appropriate Apache Spark™ configuration. In the Python Notebook, it is possible for the dataset to provide "hints" to the auto-tuning algorithm indicating whether they expect their code to be especially memory or compute hungry, such that the auto-tuning algorithm can adjust for these concerns. These hints can be specified using known methods that can be identified by the interpreter algorithm 16 during pre-execution parsing.

The interpreter algorithm 16 allows the feature width of the data scientist's working dataset to be a different size than the feature width of the production workflow. This helps separate the concerns of the data scientist from the production context in which the Notebook executes. With this auto-feature width adjustment, the user can work on a subset of the columns that belong in the final, production dataset. This can make it possible for the data scientist to ignore unimportant columns that would otherwise clutter the Notebook workspace. It allows the data provider to create a dataset with sensitive columns removed, while still being able to run the script created by the data scientist on the full dataset. It can also allow the data scientist to work on a larger amount of rows with the same amount of useful data, by using a working dataset with the unneeded columns removed.

In many instances, a data scientist can develop a novel ML algorithm or transformation that can function on an arbitrary number of features. The Auto-feature support ensures that the width of the example data sets used by the data scientist during experimentation are enforced for the productionized version of the Notebook.

The interpreter algorithm 16 also allows the user to be flexible about the schema and type matching of the development dataset and the production set. The user can list types that are functionally equivalent in the dataset. The interpreter algorithm 16 then allows the Notebook to be executed in a workflow that matches either of those types. For example, an integer is generally represented by 16 bits, and integers can be converted to a 'long' type without loss in value. The interpreter algorithm 16 provides a mechanism that allows the Notebook developer to indicate that the Notebook performs operations that will work on groups of different types with no loss in accuracy.

The interpreter algorithm 16 also provide various ways of extracting information generated in the Notebook to external services, separate from the output data flow. Helper functions allow the data scientist to export models and visualizations to an external service. The provided functions accept model and visualization objects as parameters and pushes those assets on execution. When the data model algorithm 14 is run in the production flow, these output functions win create the same type of assets but using the production data. This results in real-time asset updates without requiring the operations engineer to write any code.

Figure 3:
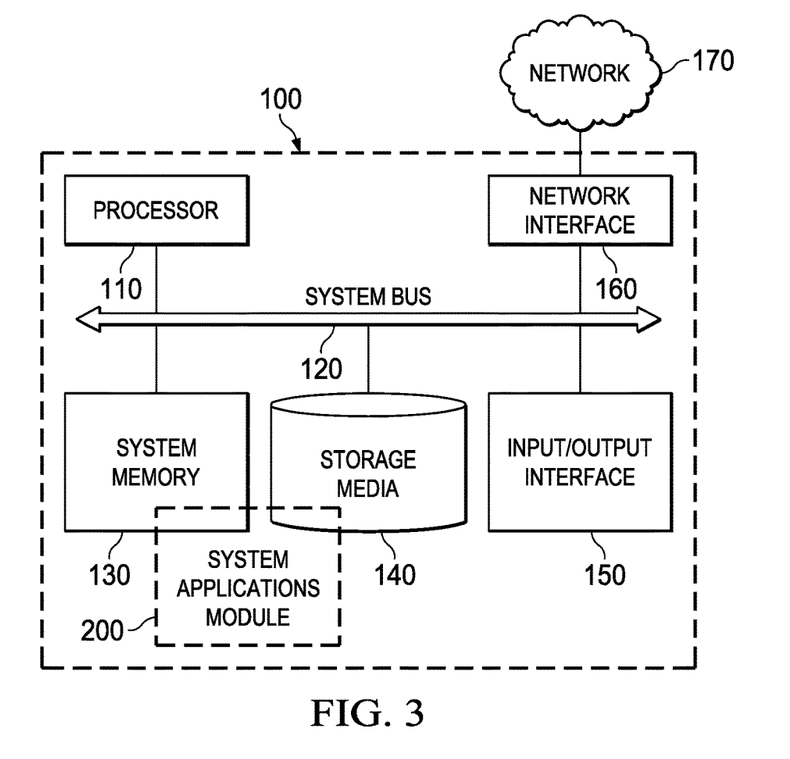
FIG. 3 is a block diagram depicting a computing device and system applications, in accordance to certain example embodiments.

Referring now to FIG. 3, illustrated is a computing device 100 and a system applications module 200, in accordance with example embodiments. The computing device 100 can correspond to any of the various computers, mobile devices, laptop computers, servers, embedded systems, or computing systems presented herein. The module 200 can comprise one or more hardware or software elements, e.g. other OS application and user and kernel space applications, designed to facilitate the computing device 100 in performing the various methods and processing functions presented herein, i.e. the algorithms of FIG. 1 and FIG. 2. The computing device 100 can include various internal or attached components such as a processor 110, system bus 120, system memory 130, storage media 140, input/output interface 150, a network interface 160 for communicating with a network 170, e.g. cellular/GPS, Bluetooth, or WIFI.

The computing devices can be implemented as a conventional computer system, an embedded controller, a laptop, a server, a mobile device, a smartphone, a wearable computer, a customized machine, any other hardware platform, or any combination or multiplicity thereof. The computing devices can be a distributed system configured to function using multiple computing devices interconnected via a data network or bus system.

The processor 110 can be designed to execute code instructions in order to perform the operations and functionality described herein, manage request flow and address mappings, and to perform calculations and generate commands. The processor 110 can be configured to monitor and control the operation of the components in the computing devices. The processor 110 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 110 can be a single processing unit, multiple processing units, a single processing core, multiple processing cores, special purpose processing cores, co-processors, or any combination thereof. According to certain embodiments, the processor 110 along with other components of the computing device 100 can be a software based or hardware based virtualized computing device executing within one or more other computing devices.

The system memory 130 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 130 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 130. The system memory 130 can be implemented using a single memory module or multiple memory modules. While the system memory 130 is depicted as being part of the computing device, one skilled in the art will recognize that the system memory 130 can be separate from the computing device 100 without departing from the scope of the subject technology. It should also be appreciated that the system memory 130 can include, or operate in conjunction with, a non-volatile storage device such as the storage media 140.

The storage media 140 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 140 can store one or more operating systems, application programs and program modules, data, or any other information. The storage media 140 can be part of, or connected to, the computing device. The storage media 140 can also be part of one or more other computing devices that are in communication with the computing device such as servers, database servers, cloud storage, network attached storage, and so forth.

The applications module 200 and other OS application modules can comprise one or more hardware or software elements configured to facilitate the computing device with performing the various methods and processing functions presented herein. The applications module 200 and other OS application modules can include one or more algorithms or sequences of instructions stored as software or firmware in association with the system memory 130, the storage media 140 or both. The storage media 140 can therefore represent examples of machine or computer readable media on which instructions or code can be stored for execution by the processor 110. Machine or computer readable media can generally refer to any medium or media used to provide instructions to the processor 110. Such machine or computer readable media associated with the applications module 200 and other OS application modules can comprise a computer software product. It should be appreciated that a computer software product comprising the applications module 200 and other OS application modules can also be associated with one or more processes or methods for delivering the applications module 200 and other OS application modules to the computing device via a network, any signal-bearing medium, or any other communication or delivery technology. The applications module 200 and other OS application modules can also comprise hardware circuits or information for configuring hardware circuits such as microcode or configuration information for an FPGA or other PLD. In one exemplary embodiment, applications module 200 and other OS application modules can include algorithms capable of performing the functional operations described by the flow charts and computer systems presented herein.

The input/output ("I/O") interface 150 can be configured to couple to one or more external devices, to receive data from the one or more external devices, and to send data to the one or more external devices. Such external devices along with the various internal devices can also be known as peripheral devices. The I/O interface 150 can include both electrical and physical connections for coupling the various peripheral devices to the computing device or the processor 110. The I/O interface 150 can be configured to communicate data, addresses, and control signals between the peripheral devices, the computing device, or the processor 110. The I/O interface 150 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 150 can be configured to implement only one interface or bus technology. Alternatively, the I/O interface 150 can be configured to implement multiple interfaces or bus technologies. The I/O interface 150 can be configured as part of, all of, or to operate in conjunction with, the system bus 120. The I/O interface 150 can include one or more buffers for buffering transmissions between one or more external devices, internal devices, the computing device, or the processor 120.

The I/O interface 150 can couple the computing device to various input devices including mice, touch-screens, scanners, electronic digitizers, sensors, receivers, touchpads, trackballs, cameras, microphones, keyboards, any other pointing devices, or any combinations thereof. The I/O interface 150 can couple the computing device to various output devices including video displays, speakers, printers, projectors, tactile feedback devices, automation control, robotic components, actuators, motors, fans, solenoids, valves, pumps, transmitters, signal emitters, lights, and so forth.

The computing device 100 can operate in a networked environment using logical connections through the NIC 160 to one or more other systems or computing devices across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 110 can be connected to the other elements of the computing device or the various peripherals discussed herein through the system bus 120. It should be appreciated that the system bus 120 can be within the processor 110, outside the processor 110, or both. According to some embodiments, any of the processors 110, the other elements of the computing device, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A computing device for interpreting a data model algorithm, the computing device comprising:
   an interpreter configured by a processor to:
   identify attributes of data models generated by the data model algorithm in a development mode workflow, wherein each attribute of the attributes has a use type, and wherein the data model algorithm is an algorithm that develops the data models for a clustered computing environment including a plurality of cluster nodes;
   identify type information of the identified attribute; and
   create data schema using the identified attributes and type information;
   a translator configured by a processor to:
   retrieve production level data schema in a production mode workflow from the clustered computing environment;
   translate the data model algorithm from a development state to a production ready state by accessing and importing the production level data schema from the clustered computing environment and comparing and validating the data schema with the production level data schema for at least one node of the plurality of cluster nodes in the clustered computing environment.

2. The computing device of claim 1 wherein the interpreter determines the use type by determining values associated with an identified attribute.

3. The computing device of claim 1 wherein the interpreter determines the use type by determining an interface type associated with an identified attribute.

4. The computing device of claim 1 wherein each attribute and type define a column name and data type in the data schema.

5. The computing device of claim 1 further comprises the translator comparing column heading types of the data schema and the production level data schema to determine validity of the data schema.

6. The computing device of claim 1 wherein the translator automatically retrieves the production level data schema from the clustered computing environment in response to selecting the data model algorithm for inclusion in the production mode workflow.

7. The computing device of claim 1 wherein the data model algorithm is a Python™ Notebook.

8. A method for interpreting a data model algorithm, the method comprising:
   identifying attributes of data models generated by the data model algorithm in a development mode workflow, wherein each attribute of the attributes has a use type, and wherein the data model algorithm is an algorithm that develops the data models for a clustered computing environment including a plurality of cluster nodes;
   identifying the type information of the identified attribute;
   creating data schema using the identified attributes and type information;
   retrieve production level data schema in a production mode workflow from the clustered computing environment; and
   translating the data model algorithm from a development state to a production ready state by accessing and importing the production level data schema from the clustered computing environment and comparing and validating the data schema with the production level data schema for at least one node of the plurality of cluster nodes in the clustered computing environment.

9. The method of claim 8 further comprises determining the use type by determining values associated with an identified attribute.

10. The method of claim 8 further comprises determining the use type by determining an interface type associated with an identified attribute.

11. The method of claim 8 wherein each attribute and type define a column name and data type in the data schema.

12. The method of claim 8 further comprises comparing column heading types of the data schema and the production level data schema to determine validity of the data schema.

13. The method of claim 8 further comprises automatically retrieving the production level data schema from the clustered computing environment in response to selecting the data model algorithm for inclusion in the production mode workflow.

14. A non-transitory computer readable storage medium comprising a set of computer instructions executable by a processor for interpreting a data model algorithm, the computer instructions configured to:
   identify attributes of data models generated by the data model algorithm in a development mode workflow, wherein each attribute of the attributes has a use type, and wherein the data model algorithm is an algorithm that develops the data models for a clustered computing environment including a plurality of cluster nodes;
   identify the type information of the identified attribute;
   create data schema using the identified attributes and type information;
   retrieve production level data schema in a production mode workflow from the clustered computing environment; and
   translate the data model algorithm from a development state to a production ready state by accessing and importing the production level data schema from the clustered computing environment and comparing and validating the data schema with the production level data schema for at least one node of the plurality of cluster nodes in the clustered computing environment.

15. The non-transitory computer readable storage medium of claim 14 further comprises computer instructions configured to determine the use type by values associated with an identified attribute.

16. The non-transitory computer readable storage medium of claim 14 further comprises computer instructions configured to determine the use type by evaluating an interface type associated with an identified attribute.

17. The non-transitory computer readable storage medium of claim 14 wherein each attribute and type define a column name and data type in the data schema.

18. The non-transitory computer readable storage medium of claim 14 further comprises computer instructions configured to compare column heading types of the data schema and the production level data schema to determine validity of the data schema.

19. The non-transitory computer readable storage medium of claim 14 further comprises computer instructions configured to automatically retrieve the production level data schema from the clustered computing environment in response to selecting the data model algorithm for inclusion in a production mode workflow.

20. The non-transitory computer readable storage medium of claim 14 wherein the data model algorithm is a Python™ Notebook.

* * * * *